United States Patent [19]

Mignien et al.

[11] 4,345,137
[45] Aug. 17, 1982

[54] METHOD OF WELDING SEVERAL OPTICAL FIBERS END TO END IN LAYERS AND A DEVICE FOR WELDING IN ACCORDANCE WITH SAID METHOD

[75] Inventors: Georges Mignien, Mezieu; Francis Gauthier, Eparvier, both of France

[73] Assignee: Compagnie Lyonnaise de Transmissions Optique, Clichy, France

[21] Appl. No.: 109,430

[22] Filed: Jan. 3, 1980

[30] Foreign Application Priority Data

Jan. 3, 1979 [FR] France ................................ 79 00074

[51] Int. Cl.³ .................................................. B23K 9/00
[52] U.S. Cl. ........................ 219/121 PK; 219/121 PJ; 219/121 P; 219/161; 350/96.2; 350/96.21; 269/903; 29/743
[58] Field of Search .................. 219/121 PJ, 121 PK, 219/121 P, 158, 159, 160, 161, 137 R; 350/96.20, 96.21; 269/21, 903; 228/179, 212, 4.1; 29/743; 65/DIG. 7, 152, 4 A, 4 R

[56] References Cited

U.S. PATENT DOCUMENTS

| | | | |
|---|---|---|---|
| 4,062,620 | 12/1977 | Pirolli | 350/96.20 |
| 4,079,927 | 3/1978 | Roctor | 269/903 |
| 4,118,618 | 10/1978 | Gauthier et al. | 350/96.20 |
| 4,148,559 | 4/1979 | Gauthier | 350/96.21 |

FOREIGN PATENT DOCUMENTS 2640500  3/1978  Fed. Rep. of Germany ... 350/96.21

OTHER PUBLICATIONS

Applied Physics, 4-1975, pp. 816, 817—Optical Fiber Vacuum Chuck—.
—Optical Fiber Alignment Chuck—Western Electric, 4-1977, #46 Technical Digest.
IBM, vol. 23,#5, 10-1980—Feature for Simplifying Assembly of Fiber Optic Modules.

*Primary Examiner*—B. A. Reynolds
*Assistant Examiner*—M. H. Paschall
*Attorney, Agent, or Firm*—Sughrue, Mion, Zinn, Macpeak & Seas

[57] ABSTRACT

A method of welding several optical fibers end to end in layers in a common welding plane. Each fiber (31) includes a bared portion and a covered portion. The method is applied by a device including:

(a) a microplasma welding torch (40) with a vertical axis movable in said weld plane;

(b) a supporting block (39) with: parallel positioning grooves for positioning the bared portions of the fibers; an opening (42) in the neighborhood of the weld plane; and a chamber (43) for slowing down the gases of the plasma disposed below said opening and connected thereto; and (c) components for gripping the covered portions of the fibers said gripping components being constituted by supports (11, 12) provided with parallel optical fiber positioning grooves. A positive pressure difference is set up between the upper portion and the lower portion of the fibers. The fibers are translated parallel to the axes of the optical fibers.

1 Claim, 5 Drawing Figures

METHOD OF WELDING SEVERAL OPTICAL FIBERS END TO END IN LAYERS AND A DEVICE FOR WELDING IN ACCORDANCE WITH SAID METHOD

FIELD OF THE INVENTION

The present invention relates to a method for welding several optical fibers end to end in layers in a common vertical weld plane, each fiber including a bared portion and a covered portion.

BACKGROUND OF THE INVENTION

A method of welding optical fibers is already described in published French patent application n° 2 386 830 of Apr. 6, 1977. In the above-mentioned patent application, the covered portions of the fibers are held by two multiple clamps disposed on either side of a series of positioning grooves lying in the axis of the fibers, said multiple clamps being movable parallel to the axes of the fibers with said covered portions to preposition the fibers with respect to said grooves and to position the ends of said bared portions face to face.

Said multiple clamps preferably have three positions: open, slightly tightened (so as to allow the fibers to slide), and tightened hard (so as to block the fibers for welding). However, the use of multiple clamps to hold fibers has some disadvantages: difficulty in adjusting the fiber clamping force, lack of simultaneity in the clamping of the various fibers, wear of the multiple clamps, damage caused to the fibers when they are blocked, etc.

German patent application N° 2 640 500 also provides for the ends of two optical fibers to be welded in line with each other while holding them in grooves of support blocks by means of a vacuum in a duct disposed inside the support and by using a welding device between the blocks of the support and below the ends of the fibers. Such a method does not allow accurate alignment of the fiber ends which extend over an appreciable length beyond the support blocks and allows the optical fibers to be welded together only one by one.

Preferred methods in accordance with the present invention allow several optical fibers to be welded end to end simultaneously and with great accuracy on the fiber axes. Such methods also provide even and simultaneous tightening of the fibers while they are being positioned and welded, to prevent damage to the fibers when they are clamped and to allow longer use of the welding device without appreciable wear.

SUMMARY OF THE INVENTION

A method of welding a plurality of optical fibers end to end in layers in a common vertical weld plane, each fiber including a bared portion and a covered portion, said method comprising the following steps;

(a) the covered portions of the fibers are placed in parallel positioning grooves of supports which form gripping components and the bared portions of the fibers are placed in parallel positioning grooves for the bared portions of the fibers of a supporting block provided with an opening in the neighborhood of the weld plane and with a chamber for slowing down the gases of a microplasma, said chamber being disposed below the opening and connected thereto;

(b) a microplasma welding torch with a vertical axis is disposed in the common vertical weld plane and above the ends of the fibers, said welding torch being provided with means for moving it in the weld plane;

(c) a stop plate is disposed between the ends of the fibers;

(d) a relatively low positive pressure difference is applied between the upper and lower portions of the fibers and the supports are brought closer to each other until all the ends of the fibers press against the stop plate;

(e) the stop plate is removed and a higher positive pressure difference is applied between the upper and lower portions of the fibers and the ends of the fibers are brought close together again until they come into contact end to end with each other; and (f) the ends of the fibers are welded, the difference in pressure between the upper and lower portions of the optical fibers is equalized and the welded fibers are removed.

Preferably, the positive pressure differences are applied between the upper and lower portions of the fibers by setting up a vacuum in a inner chamber of each support, said chambers communicating with the bottoms of the grooves.

The invention further provides a device for welding by the method defined hereinabove, the device including:

(a) a microplasma welding torch with a vertical axis and means for moving it in the said weld plane, said torch being located in a common vertical weld plane;

(b) a supporting block provided with: a plurality of parallel positioning grooves for positioning the bared portions of the fibers; an opening in the neighborhood of the weld plane; and a chamber for slowing down the gases of the plasma, said chamber being disposed below said opening and connected thereto; and (c) components for gripping the covered portions of the fibers and means for moving the fibers in a translation motion parallel to the axes of the optical fibers; said gripping components including a stop plate for the ends of the fibers; and means for setting up an adjustable positive pressure difference between the upper and lower portions of the fibers, and being constituted by supports provided with a plurality of parallel grooves for positioning the covered portions of the optical fibers, connected to said means for applying an adjustable positive pressure difference.

Preferably, each of the supports is provided with grooves for positioning the covered portions of the fibers; said grooves being extended by grooves which are not so deep for positioning the bared portions of the fibers.

A device in accordance with the invention for welding layers of optical fibers and a method of welding by means of said device are described hereinafter by way of example and with reference to the figures of the accompanying drawings.

DESCRIPTION OF THE PREFERRED EMBODIMENT

Figure 1:
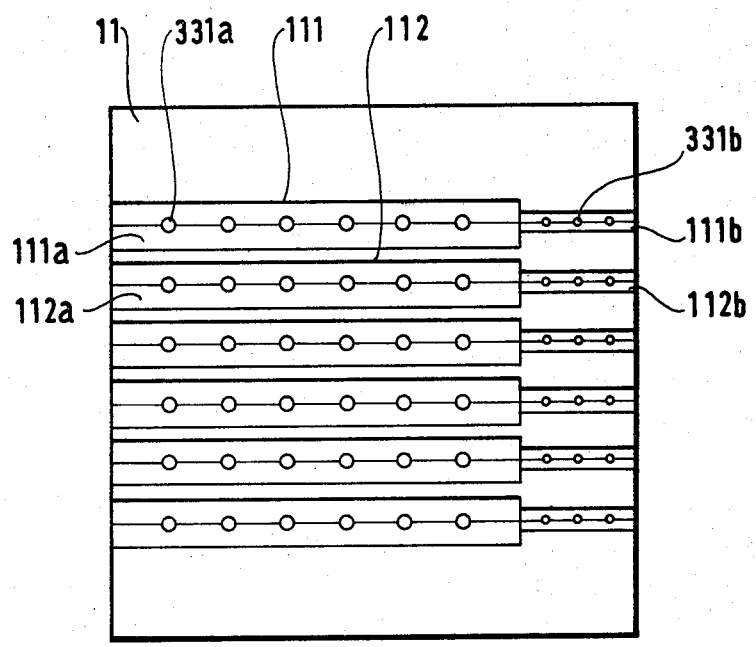
FIG. 1 is a plan of a metal gripping block for gripping the fibers.

In FIG. 1, V-shaped grooves such as 111,112, etc., are machined in a metal block 11; these grooves consist of two parts of unequal widths and lengths. The parts 111b, 112b, of smaller cross-section are placed facing the weld line. They are intended to accommodate the bared ends of the fibers to be connected together, while larger cross-section grooves 111a, 112a follow the small cross-section prooves and are used to accommodate the lengths of fiber from which the covering has not been stripped and which are adjacent to the bared ends. Successions of very small holes 331a, 331b are provided in the bottoms of the V-shaped grooves. These holes lead to a vacuum chamber connected to a suction device with a vacuum pump.

Figure 2:
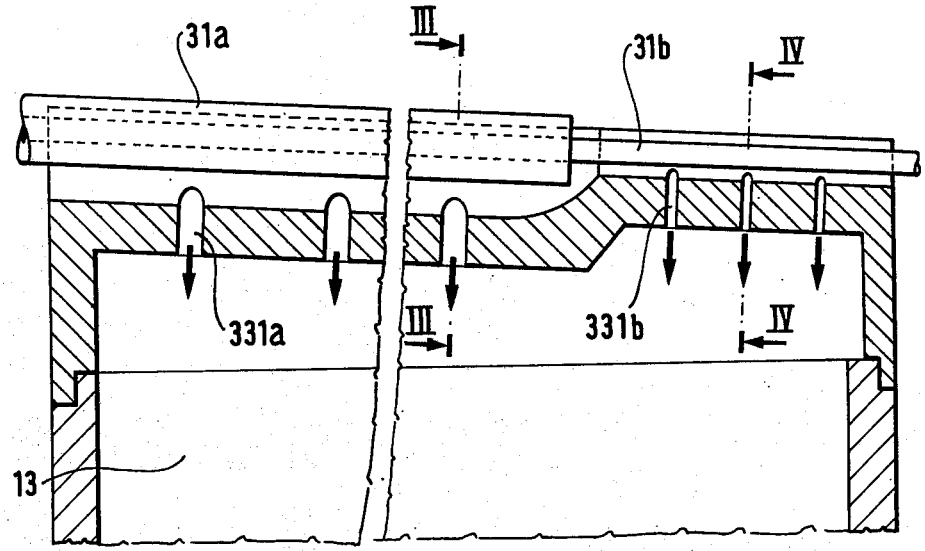
FIG. 2 is a cross-section of one of these blocks, passing through the axis of a fiber.
Figure 3:
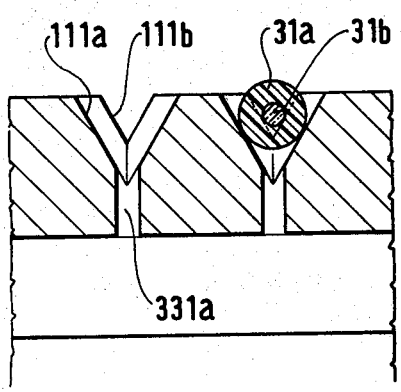
FIG. 3 is a cross-section along the axis III—III of FIG. 2.
Figure 4:
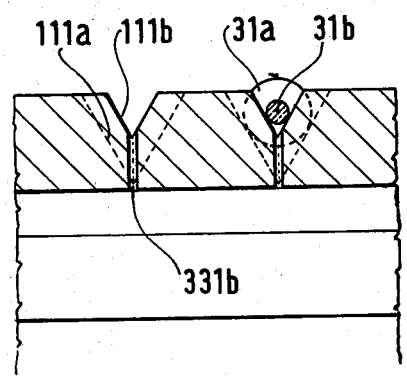
FIG. 4 is a cross-section along the axis IV—IV of FIG. 2.

FIG. 2 illustrates a cross-section through a vertical plane which passes through the axis of a fiber. It shows the covered portion 31a of the fiber and its bared portion 31b. Holes such as 331a are provided in the bottoms of the large cross-section grooves and holes such as 331b are provided in the bottoms of the small cross-section grooves. These holes lead to the cavity 13 connected to a vacuum pump, not shown in the figure. FIGS. 3 and 4 show more clearly the V-shaped profiles of the grooves, namely, profile 111a for the large cross-section grooves and 111b for the small cross-section grooves.

Figure 5:
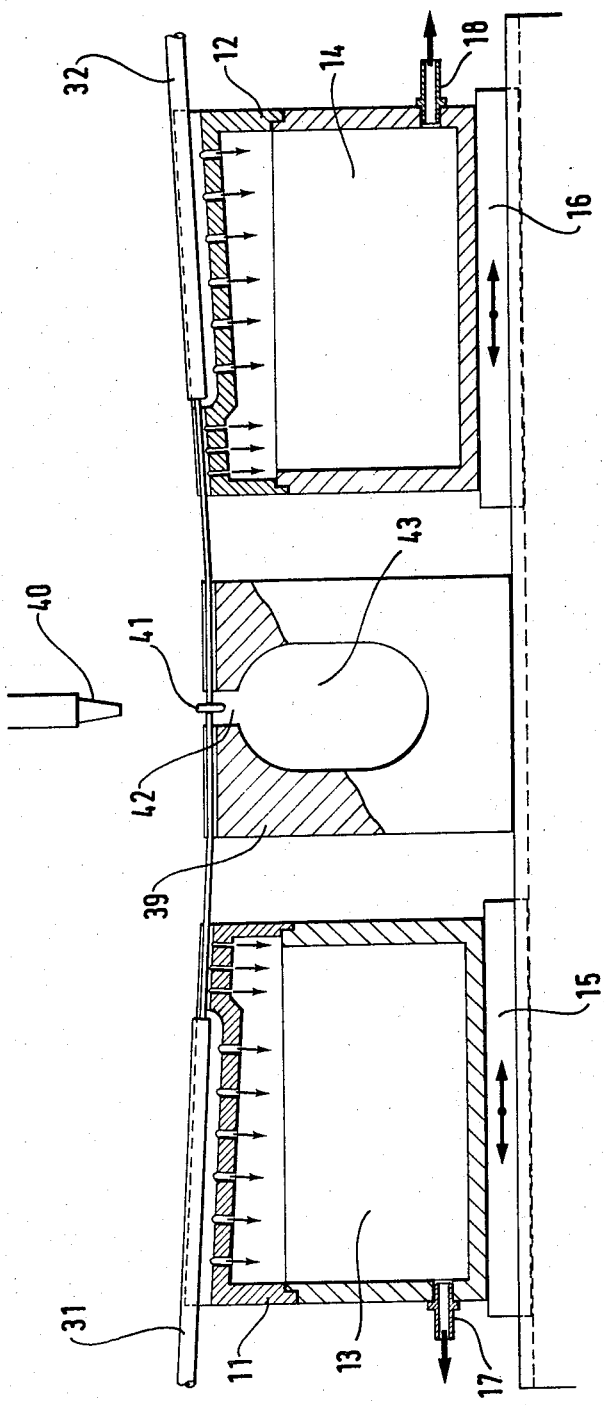
FIG. 5 is a vertical cross-section of the device as a whole.

FIG. 5 illustrates all the components of the device for welding in layers of which a cross-section is shown in a plane perpendicular to the axis of the weld line. References 31 and 32 designate two fibers which are to be joined together; 11 and 12 are metal blocks provided with V-shaped grooves which allow the positioning and fixing of the fibers.

The vacuum chambers which draw the fibers down into the grooves in which holes such as 331a and 331b are provided are designated by references 13 and 14. They are connected by pipes 17 and 18 to a vacuum pump (not shown). The positioning blocks 11 and 12 can be moved in a direction parallel to the weld line (perpendicular to the plane of the figure) by means of the slide rails 15 and 16. The ends of the fibers such as 31 and 32 to be welded rest on V-shaped grooves in line with those of the blocks 11 and 12, these V-shaped grooves being machined in a central part 39 provided with an inner chamber 43 for slowing down the gases of the plasma. A high-frequency plasma welding torch is designated by reference 40 and 41 designates a retractable plate which acts as a stop while the fibers are being positioned before welding and 42 designates an opening which leads to the chamber 43.

The operation of the device in accordance with the invention can be described as follows: the various fibers to be joined and which have been previously bared along a length of 40 mm±1 mm are placed in V-shaped grooves (such as 111,112..) in the metal blocks 11 and 12. A low vacuum of about 0.1 bars makes it possible to hold them against the bottom of the grooves but does not prevent them from sliding when the two blocks are brought close together by means of the slide rails 15 and 16 (FIG. 5). The ends of the fibers then abut against the plate 41 one after another, on either side of said plate. A higher vacuum of about 0.25 bars is then applied to hold the fibers firmly in position in the V-shaped grooves without any possibility of sliding. The stop plate 41 is retracted and the ends of the fibers are brought into contact on either side of the weld line by a further movement of the blocks 11 and 12 by means of the slide rails 15 and 16. The plasma torch 40 is then lit and set in motion in a translation movement parallel to the weld line; it successively welds the ends of the various fibers which are to be joined, placed end to end. The vacuum in the order of 0.25 bars which held the fibers in the V-shaped grooves can then be dispensed with and the assembly of fibers (which were previously positioned by two V-shaped plates) can be removed for the subsequent covering reconstitution operations and for completing the seal.

Although the welding device and method which have just been described with reference to the figures appear preferable, it will be understood that various modifications can be made thereto without going beyong the scope of the invention, it being possible to replace some components of the device or steps of the method by others which perform an analogous technical function. In particular, the inner vacuum chambers of the supports and the associated vacuum pump could be replaced by a chamber in which a high pressure prevails, said chamber being located above the upper surface of the supports and by a pressurized gas inlet pipe. The holes for making the bottoms of the grooves communicate with the vacuum chamber could be replaced by continuous slots.

We claim:

1. A method of welding a plurality of optical fibers end to end in layers in a common vertical weld plane, each fiber including a bared portion and a covered portion, said method comprising the steps of:
    (a) placing the covered portions of the fibers in parallel positioning grooves and the bared portions of the fibers in parallel positioning grooves for the bared portions of the fibers within supporting blocks, providing an opening in the neighborhood of the weld plane and a chamber for slowing down the gases of a microplasma with said chamber disposed below the opening and connected thereto;
    (b) disposing a microplasma welding torch with a vertical axis in the common vertical weld plane and above the ends of the fibers, moving said welding torch in the weld plane;
    (c) disposing a stop plate between the ends of the fibers;
    (d) applying a relatively low vacuum pressure through the bottom of said parallel positioning grooves for said covered portions and said bared portions of said fibers and bringing the blocks closer to each other until the fibers press against the stop plate with said relatively low vacuum pressure allowing said fibers to slide on said supports;
    (e) removing the stop plate and applying a higher relative vacuum pressure to said fibers through said parallel positioning grooves for said covered portions and for said bared portions of said fibers to securely clamp the fibers to said supports and bringing said blocks further closer together and the ends of the fibers closer until they come into contact end to end with each other;
    (f) welding the ends of the fibers and terminating the vacuum pressure to said grooves to unclamp said fibers, and removing the welded fibers.

* * * * *